(12) United States Patent
Hiraoka et al.

(10) Patent No.: US 7,023,608 B2
(45) Date of Patent: Apr. 4, 2006

(54) PARTICLE FOR A DISPLAY DEVICE, IMAGE DISPLAY MEDIUM AND IMAGE FORMING APPARATUS

(75) Inventors: Satoshi Hiraoka, Minamiashigara (JP); Hidehiko Soyama, Minamiashigara (JP); Yasuo Yamamoto, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 247 days.

(21) Appl. No.: 10/626,564

(22) Filed: Jul. 25, 2003

(65) Prior Publication Data

US 2004/0155858 A1 Aug. 12, 2004

(30) Foreign Application Priority Data

Dec. 20, 2002 (JP) .............................. 2002-370481

(51) Int. Cl.
*G02B 26/00* (2006.01)
*G09G 3/34* (2006.01)

(52) U.S. Cl. ...................................... 359/296; 345/107

(58) Field of Classification Search ................ 359/296, 359/452, 243, 253, 240; 345/105, 108, 107, 345/111; 204/450, 600; 252/572
See application file for complete search history.

(56) References Cited

U.S. PATENT DOCUMENTS

| 4,620,916 | A | * | 11/1986 | Zwemer et al. | ............. 359/296 |
| 6,738,039 | B1 | * | 5/2004 | Goden | ......................... 345/107 |
| 6,853,477 | B1 | * | 2/2005 | Nomoto et al. | ............. 359/296 |

\* cited by examiner

*Primary Examiner*—Georgia Epps
*Assistant Examiner*—M. Hasan
(74) *Attorney, Agent, or Firm*—Oliff & Berridge, PLC

(57) ABSTRACT

A particle for a display device having a positively or negatively chargeable property and a color, the particle for a display device comprising nitrogen atoms in an amount of 0.03 mmol/g to 0.2 mmol/g. This particle for a display device can avoid reduction in image density and density contrast even after repeated rewriting, and thus prevent decrease in uniformity of an image and unevenness in image from occurring.

18 Claims, 10 Drawing Sheets

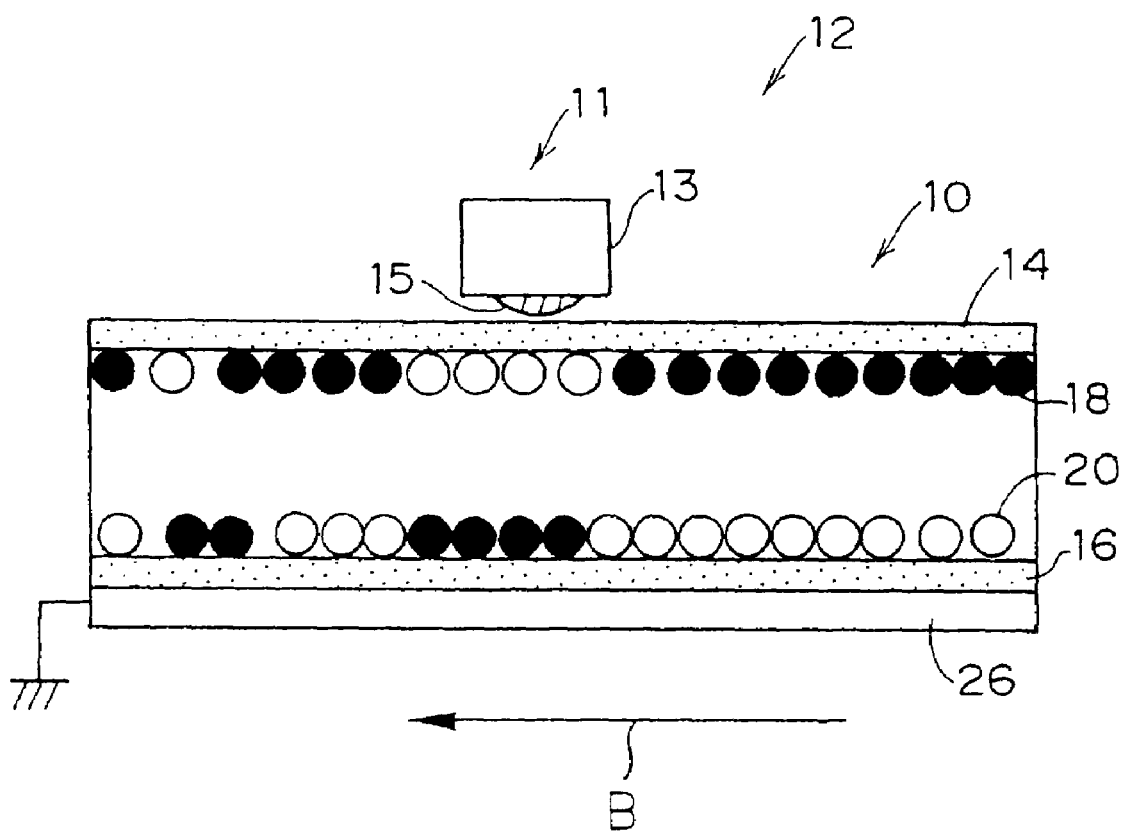

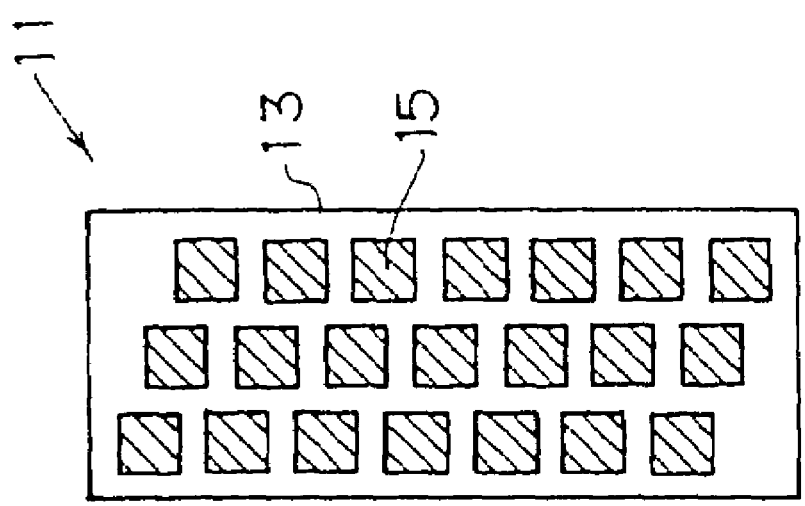
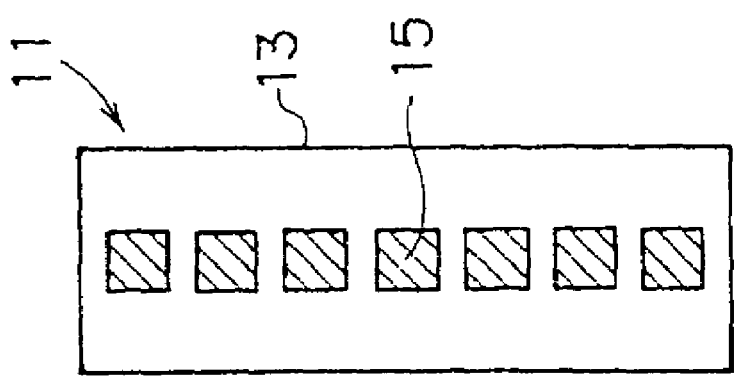
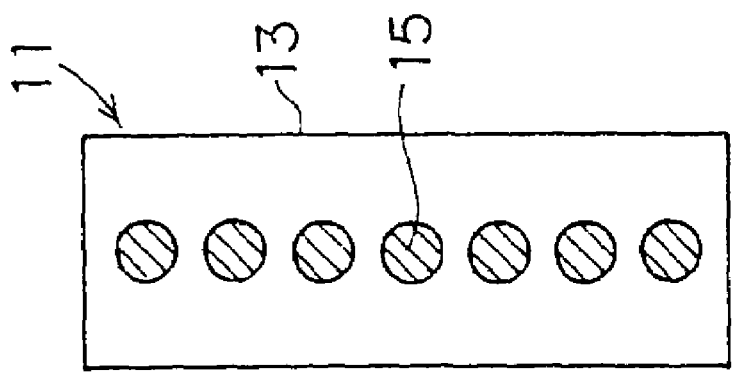

PARTICLE FOR A DISPLAY DEVICE, IMAGE DISPLAY MEDIUM AND IMAGE FORMING APPARATUS

CROSS-REFERENCE TO RELATED APPLICATION

This application claims priority under 35 USC 119 from Japanese patent application, No. 2002-370481, the disclosure of which is incorporated by reference herein.

BACKGROUND OF THE INVENTION

1. Field of the Invention

The present invention relates to an image display medium repeatedly rewritable thereon, a particle for a display device using therein and an image forming apparatus.

2. Description of the Related Art

Traditionally, there have been proposed various display techniques as a image display medium repeatedly rewritable thereon, such as a Twisting Ball Display (bichromal particle rotational display) medium, an electrophresis medium, a magnetophoresis medium, a thermal rewritable medium, a liquid crystal medium having a memorizing property and the like. There has been a problem that the display techniques described above cannot obtain a white display like paper on a display screen and have a low contrast in a display thereon, though with excellency in image memorizing property.

As a display technique, using a toner, to solve a problem as described above, a technique has been proposed in which a conductive colored toner and white particles are sealed between electrode substrates facing each other, a charge is injected into the conductive colored toner through a charge transporting layer provided on the inner surface of an electrode on a non-display substrate, and the conductive colored toner injected with a charge is moved to the display substrate facing the non-display substrate by an electric field between the electrode substrates and attached to the inner side of the display substrate to thereby present an image display with the help of a contrast between the conductive colored toner and the white particles (see "Japan Hardcopy '99, collection of papers, pp. 249–252"). In this technique, an image display medium is all constituted of solid constituents and excellent in that displays in white and black, in principle, can be perfectly switched therebetween. In the above described technique, however, there exist a conductive colored toner not in contact with the charge transporting layer provided on the inner side surface of an electrode on the non-display substrate and/or a conductive colored toner isolated from the other conductive colored toner, and because these toners are not injected with charge, are not moved by the electric field and randomly distributed on the display substrate. Therefore, there arises a problem that a density contrast is lowered.

An image display medium has been proposed for the purpose to solve such a problem, which includes a pair of substrates and particle groups of plural types of particles different in color and electrical charge characteristic from each other sealed between the substrates so as to be freely movable between the substrates by an applied electric field (see "Japanese Patent Application Laid-Open (JP-A) No. 2001-312225"). With this image display medium, a high whiteness and a high density contrast can be attained.

Though image display medium is excellent in a white density and a black density in an initial stage, after repetition of rewriting, reduction occurs in image density, density contrast and uniformity of an image, thereby causing unevenness in image.

SUMMARY OF THE INVENTION

The present invention has a task to solve such problems in the prior art. That is, it is an object of the present invention to provide a particle for a display device, with which neither an image density nor a density contrast is reduced even after repetition of rewriting, and decrease in uniformity of an image and unevenness in image can be prevented from occurring; an image display medium using the particle for a display device and an image forming apparatus.

Another object of the invention is to provide an image display medium capable of not only setting a drive voltage to a low value, but also ensuring a stable display image over a long term regardless of an external shock imposed thereon and being left still for a long time; and an image forming apparatus using the image display medium.

The above objects are solved by the following features <1> to <6> of the invention.

<1> A particle for a display device having a positively or negatively chargeable property and a color, the particle for a display device comprising nitrogen atoms in an amount of 0.03 mmol/g to 0.2 mmol/g.

<2> The particle for a display device according to the feature <1> is made from at least a colorant, a resin and a nitrogen atom-containing compound.

<3> An image display medium comprising: a pair of substrates facing each other; and a particle group composed of at least 2 or more types of particles sealed in a clearance between the pair of substrates, at least one type of the two or more types of particles having a positively chargeable property, at least another type of the two or more types of particles having a negatively chargeable property, and the positively and negatively chargeable particles, respectively, being of colors that are different from each other, wherein at least one type of the positively and negatively chargeable particles contains nitrogen atoms in an amount of 0.03 mmol/g to 0.2 mmol/g.

<4> At least one type of the positively or negatively chargeable particles included in the image display medium according to the feature <3> is black or of a chromatic color.

<5> At least one type of the positively or negatively chargeable particles included in the image display medium according to the feature <3> is white.

<6> An image forming apparatus comprising: an image forming medium on which an image is formed; and an electric field generating means, wherein the image forming medium includes: a pair of substrates facing each other; and a particle group composed of at least 2 or more types of particles sealed in a clearance between the pair of substrates, at least one type of the two or more types of particles having a positively chargeable property, at least another type of the two or more types of particles having a negatively chargeable property, the positively/negatively chargeable particles respectively being of colors that are different from each other, at least one type of the positively/negatively chargeable particles containing nitrogen atoms in a predetermined content, and the nitrogen atoms taking a bond formation enabling reduction in aggregation between the nitrogen-containing particles and reduction in peeling of the nitrogen-containing particle from a substrate, and wherein the electric field generating means generates an electric field corresponding to image information, between the pair of substrates, to thereby form an image on the image forming medium.

BRIEF DESCRIPTION OF THE DRAWINGS

FIG. 6 is a view showing a schematic structure of still another example (a third embodiment) of the image forming apparatus of the invention.

FIGS. 7A to 7C are schematic views showing arrangement patterns of electrodes of a printing electrode.

DETAILED DESCRIPTION OF THE INVENTION

Figure 1:
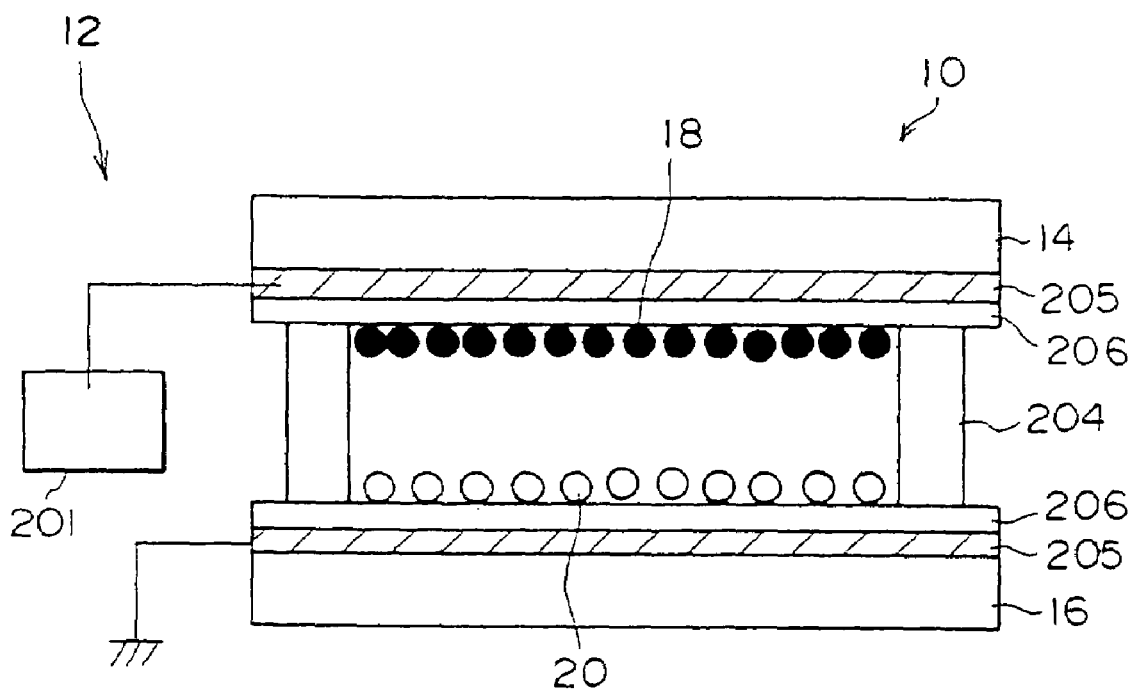
FIG. 1 is a view of a schematic construction showing an example (a first embodiment) of an image forming apparatus of the present invention.

Detailed description will be given of a particle for a display device, an image display medium using a particle for a display device and an image forming apparatus below, of the present invention.

[Structure of Particle for a Display Device of the Invention]

A particles for a display device of the invention is a particle for a display device having a positively or negatively chargeable property and color, containing nitrogen atoms in the range of from 0.03 mmol/g to 0.2 mmol/g.

If a content of nitrogen atoms contained in the particle for a display device is outside the above described range, an image density is reduced to thereby decrease a density contrast and further uniformity in an image deteriorates, which leads to unevenness in image, because of aggregation of particle for a display device with each other in repetition of rewriting.

Note that a content of nitrogen atoms contained in particle for a display device is preferably in the range of from 0.04 mmol/g to 0.15 mmol/g and more preferably in the range of from 0.04 mmol/g to 0.12 mmol/g.

Each of nitrogen atoms contained in a particle for a display device of the present invention plays a role of a starting point of positive charging when the particle for a display device are charged. Therefore, while nitrogen atoms included in a particle for a display device may take any bond formation, as far as each of the nitrogen atoms functions as the starting point of positive charging. Specifically, it is preferable that each of the nitrogen atoms takes any of the bonding forms of primary to tertiary amines.

As components composing a particle for a display device of the invention, no particular limitation is imposed thereon as far as nitrogen atoms are contained in the range of from 0.03 mmol/g to 0.2 mmol/g. It is preferable, in actual application, to include a colorant and a resin. Furthermore, it is acceptable to include other components such as a charge control agent, polymer fine particles and others if necessary.

Note that a colorant may also serve as a charge control agent. Furthermore, nitrogen atoms contained in a particle for a display device may be supplied in a form that the nitrogen atoms are originally contained in a colorant and a resin or alternatively, may be additionally supplied as a compound containing a nitrogen atom (hereinafter abbreviated to a "nitrogen-containing compound") together with a colorant and a resin. In the case where particle for a display device of the invention are prepared using wet polymerization such as suspension polymerization, however, the latter method, i.e., a nitrogen containing compound is preferably used since it is easy to adjust a content of nitrogen atoms and to select a bond form of a nitrogen atom, which are contained in a particle for a display device.

(Nitrogen-Containing Compound)

As the nitrogen-containing compound used in preparation of particle for a display device of the invention, while no particular limitation is imposed on the nitrogen-containing compound, a nitrogen atom contained in the nitrogen-containing compound preferably takes the bond formation of any of primary amine to tertiary amine. Further, the nitrogen-containing compound is preferably a monomer including a reactive group capable of a polymerization reaction and a crosslinking reaction in a molecule. Note that the number of nitrogen atoms contained in a monomer molecule is not particularly limited to any number as far as one or more nitrogen atoms are contained in the monomer.

While detailed description will be given of a monomer below as a specific example having a molecular structure, as shown in the following general formula (1), including one nitrogen atom and one group bonding to the nitrogen atom and capable of a polymerization reaction and a crosslinking reaction, a nitrogen-containing compound used in the invention is not limited to only this specific example of the following general formula (1):

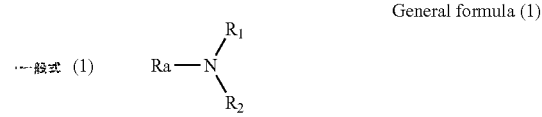

General formula (1)

In the general formula (1), Ra indicates a reactive group (a group capable of a polymerization reaction and/or a crosslinking reaction), on which no particular limitation is imposed as far as the reactive group is a known functional group capable of a polymerization reaction and/or a crosslinking reaction that includes a double bond, capable of a polymerization reaction, such as a monovalent acrylic acid ester, a monovalent methacrylic acid ester and the like.

Furthermore, $R^1$ and $R^2$ are any of a hydrogen atom, an alkyl group, a phenyl group, a carboxyl group, hydroxyl group and the like, wherein a structure of a group indicated by $R^1$ is may be either the same as or different from a structure of a group indicated by $R^2$.

Note that in the case where $R^1$ and $R^2$ are alkyl groups, the number of carbon atoms each of $R^1$ and $R^2$ is preferably in the range of from 1 to 8 and more preferably in the range of from 1 to 3; and it is especially preferable that $R^1$ and $R^2$ each are a methyl group or an ethyl group.

Specific examples of the nitrogen-containing compound as represented by the general formula (1) described above include, in the case where Ra is a nonovalent acrylic acid ester or a monovalent methacrylic acid ester and $R^1$ and $R^2$ are alkyl groups, monomers such as diethylaminoethyl acrylate, dimethylaminoethylacrylate, dimethylaminoethyl methacrylate, diethylaminoethyl methacrylate and the like.

Note that in the case where particle for a display device of the invention are prepared with a monomer as represented by the general formula (1), a mixing amount of the monomer as represented by the general formula (1) is to be adjusted so that a content of nitrogen atoms contained in the particle for a display device falls in the range of 0.03 mmol/g to 0.2 mmmol/g as described above, and preferably in the range of from 0.04 mmol/g to 0.12 mmol/g.

(Colorants)

As a colorant used in a particle for a display device of the invention, no particular limitation is imposed thereon, as far as the colorant is a known colorant which is appropriate for the application. Specific examples of the colorants are as follows:

As a black colorant, examples thereof include organic and inorganic dyes and pigments, such as carbon black, titanium black, magnetic powder, oil black and the like.

As a white colorant, examples thereof include white pigments such as rutile type titanium oxide, anatase type titanium oxide, Chinese white, lead white, zinc sulfide, aluminum oxide, silicon oxide, zirconium oxide and the like.

As colorants of chromatic colors, examples thereof include dyes and pigments such as, a phthlocyanine type, a quinacridone type, an azo type, a condensation type, an insoluble lake pigment and an inorganic oxide type. Specific examples thereof include aniline blue, calcoil blue, chrome yellow, ultramarine blue, du Pont oil red, quinoline yellow, methylene blue chloride, phthalocyanine blue, malakite green oxalate, lamp black, rose bengal, C. I. pigment red 48:1, C. I. pigment red 122, C. I. pigment red 57:1, C. I. pigment yellow 97, C. I. pigment blue 15:1, C. I. pigment blue 15:3 and the like.

The dyes and pigments may be subjected to a surface treatment or the like for the purpose of improvement on dispersibility if necessary.

As specific pigments of chromatic colors, pigments for use in color filter may be used. Examples thereof include blue color pigments each having a maximum absorption wavelength in the range of from 400 nm to 500 nm; green pigments each having a maximum absorption wavelength in the range of from 500 nm to 600 nm; red pigments each having a maximum absorption wavelength in the range of from 600 nm to 700 nm and the like. To be more specific, there are further exemplified: blue pigments such as C. I. pigment blue 15 (including 15:3, 15:4, 15:6 and the like), 21, 22, 30, 64 and the like; green pigments such as C. I. pigment green 7, 10, 36, 47 and the like; red pigments such as C. I. pigment red 9, 97, 122, 123, 144, 149, 166, 168, 177, 180, 192, 215, 216, 224 and the like.

The specific pigments described above are preferably used as a master batch pigment. Herein, the term "master batch" means a preliminary mixture for a final molded product (a particle for a display device in a case of the invention) produced in order to improve economy of colorant mixing, and dispersion of a colorant and uniformity thereof; and in addition, to improve easiness of molding and weighing in injection and extrusion, and like, which is prepared by mixing and kneading a pigment with a desired color at a high concentration, usually, in the range of from 5 to 50% by mass into a raw resin, to furthermore shape the mixture into in a pellet like shape (or a flake or sheet like shape).

As raw resins used for a master batch pigment, examples thereof include: homopolymers and copolymers prepared from radically polymerizable monomers such as styrene, methylstyrene, chlorostyrene, vinyl acetate, vinyl propionate, methyl acrylate, ethyl acrylate, propyl acrylate, n-butyl acrylate, isobutyl acrylate, n-octyl acrylate, dodecyl acrylate, 2-ethylhexyl acrylate, stearyl acrylate, methyl methacrylate, ethyl methacrylate, propyl methacrylate, n-butyl methacrylate, isobutyl methacrylate, n-octyl methacrylate, dodecyl methacrylate, 2-ehtylhexyl methacrylate, stearyl methacrylate, acrylonitrile, methacrylonitrile, acrylamide, methacrylamide, glycidyl acrylate, glycidyl methacrylate, acrylic acid, methacrylic acid, 2-vinyl pyridine and the like; and polyester resin, polyamide resin, epoxy resin and the like.

Description will be given of a production method for a master batch pigment below: First of all, a specified pigment described above and a raw resin described above are pulverized and dispersed into an organic solvent to prepare a pigment dispersion. In this pulverization and dispersion processing, there are employed medium agitating mills such as a sand mill, a ball mill, an atrider and the like. The pulverization and dispersion processing may be performed either in a batch type or in a continuous type. Thereafter, the organic solvent is removed from the pigment dispersion and a remainder is further pulverized to prepare a master batch pigment, in which the specific has uniformly been dispersed into a raw resin.

In the case where particle for a display device of the invention are produced using thus obtained master batch pigment, the master batch pigment is added and dispersed into a monomer.

As structures of colorants each also serving as a charge control agent, examples thereof include a structure having an electron attractive group or an electron donating group, a metal complex and the like. Specifically, there are exemplified: C. I. pigment violet 1, C. I. pigment violet 3, C. I. pigment violet 23, C. I. pigment black 1 and the like.

An amount of a colorant to be added is preferably in the range of from 1 to 60% by mass and more preferably in the range of from 5 to 50% by mass with respect to the total mass of particles, when the specific gravity of the colorant is 1.

Furthermore, in the case where a colorant is a specific pigment, an amount thereof to be added is preferably in the range of from 1 to 60% by mass and more preferably in the range of from 5 to 30% by mass with respect to the total mass of the particles, when the specific gravity of a colorant is 1.

(Resins)

As resins, examples thereof include: polyvinyl based resins such as polyolefin, polystyrene, acrylic resin, polyacrylonitrile, polyvinyl acetate, polyvinyl alcohol, polyvinyl chloride, polyvinyl butyral and the like; vinyl chloride-vinyl acetate copolymer; styrene-acrylic acid copolymer; straight silicone resin including organosiloxane bonds and a modification thereof; fluororesins such as polytetrafluoroethylene, polyvinyl fluoride, polyvinydene fluoride and the like; polyester; polyurethane; polycarbonate; amino resin; epoxy resin and the like. The resins described above may be used either alone or in a mixture of plural types. The resins may be crosslinked. Furthermore, there can be adopted, without causing any problem, a binder resin known as a primary component in a toner employed in the conventional electrophotography. It is especially preferable to use a resin including a croosslikable component.

(Polymer Fine Particles)

While a known, conventional polymer can be used as a raw material of the polymer fine particle of the invention, a polymer fine particle, having specific gravity lower than the specific gravity of a colorant simultaneously used, is preferably used. Furthermore, in the case where a polymer fine particle itself has a color, the polymer fine particle may be selected in an appropriate manner, in consideration of the color exhibited by the colorant simultaneously used. Furthermore, as resins to be used together with the polymer fine particles, while resins described below can be used, a methacrylic based resin or an acrylic based resin are preferably used.

Specific examples of the polymer fine particles include particles of resins such as polystyrene resin, polymethyl methacrylate resin, urea-formalin resin, styrene/acrylic resin, polyethylene resin, polyvinylidene fluoride resin, which are used either alone or in combination. Note, however, that the polymer fine particles are not limited to these specific examples. The resins are preferably of a crosslinking structure and more preferably have a refractive indexes higher than that of a resin phase in use.

There can be used a polymer fine particle of a spherical shape, an irregular shape, a flat shape or the like. Preferably, a polymer fine particle of a spherical shape is used.

A volume average particle diameter of polymer fine particles needs to be smaller than that of the particle for a display device, and is preferably equal to or less than 10 µm and more preferably equal to or less than 5 µm. Furthermore, a particle size distribution is preferably sharp in the shape and more preferably of a single dispersion.

Furthermore, from the viewpoint of preparation of particle for a display device whose specific gravity is further lower, it is preferable that a part or all of polymer fine particles are composed of hollow particles. A volume average particle diameter of such hollow particles needs to be smaller than that of the particle for a display device, and is preferably equal to or smaller than 10 µm and more preferably equal to or smaller than 5 µm. Particularly, in a case of the hollow particles, a volume average particle diameter thereof is further more preferably in the range of from 0.1 to 1 µm and particularly preferably in the range of from 0.2 to 0.5 µm, in terms of improving the light scattering property.

Herein, the term "hollow particle" indicates a particle with a void therein. The void is preferably in the range of from 10% to 90%. Furthermore, the "hollow particle" may be either in the shape of a capsule or a particle with the outer wall being porous.

Furthermore, a hollow particle can raise a whiteness and a concealment effect, as a result of light scattering. In a case of a hollow capsule shape, such an effect is caused by a difference in refractive index between a resin layer of a crust and an air layer in the interior of the particle at the interface therebetween. In a case of a particle with the outer wall being porous, the whiteness and concealment-raising effect is caused by a difference in refractive index between the outer wall and cavity thereof. Therefore, hollow particles are especially preferably incorporated into each of white particle for a display device.

Furthermore, in a particle for a display device of the invention, an amount to be added, of polymer fine particles, is preferably in the range of from 1 to 40% by mass and more preferably in the range of from 1 to 20% with respect to the total weight of the particles for a display device. If an amount of polymer fine particles to be added is less than 1% by mass, an effect of reduction in specific gravity caused by addition of polymer fine particles may not be sufficient. Furthermore, in the case where an amount to be added, of polymer fine particles, is more than 40% by mass, workability such as dispersibility or the like, in preparation of particle for a display device each in a preferable form, may deteriorate.

(Other Additives)

A charge control agent may be added to a particle for a display device of the invention, if necessary, in order to regulate the charging property thereof. As charge control agents, there can be used a known agent used in an electrophotographic toner and specific examples thereof include cetylpyridyl chloride, quaternary ammonium salts such as P-51 and P-53 (manufactured by Orient Chemical Industries, Ltd.), a salicylic acid metal complex, a phenol condensate, a tetraphenyl compound, a calyxallene compound, a metal oxide fine particle, metal oxide fine particles whose surface has been treated with various types of coupling agents, and the like.

A charge control agent is desirably achromatic, low in color developing power or of a color of the same family as the colors of all of the particles included. With a charge control agent that is achromatic, low in color developing power or of a color of the same family as the colors of all of the particles included (that is, a color of the same family as the color of a colorant included in the particles) used, an impact on a color of selected particles can be reduced.

Herein, the term "achromatic" means of hueless color and the term "low in color developing power" means a small influence on the colors of all of the particles included. Furthermore, the term "of a color of the same family as the colors of all of particles included" means that, although a charge control agent itself has a color, the color thereof is the same as the colors of all of the particles included or of a color similar to the colors of all of the particles. As a result, the term means that only a small influence is exerted by the color on the colors of all of the particles included. For example, in the particles including a white pigment as a colorant, a charge control agent of white color is classified into a category of "of a color of the same family as the colors of all of particles included." Regarding a color of a charge control agent, the color may either be "achromatic" or "low in color developing power" or "of a color of the same family as the colors of all of particles included", as long as the color of the charge control agent becomes a desired color.

An amount to be added, of a charge control agent, is preferably in the range of from 0.1 to 10% by mass and more preferably in the range of from 0.5 to 5% by mass. Furthermore, the size of a dispersion unit as particles, of a charge control agent, is preferably equal to or less than 5 µm or less and more preferably 1 µm or less in volume average particle diameter. A charge control agent may be present in particles in a compatible state.

A particle for a display device of the invention is preferably further added with a resitivity adjusting agent. With a resistivity adjusting agent added, charge exchange between particles can be faster to thereby enable an early stabilization of a display image to be established at an early stage. Herein, the term "resistivity adjusting agent" means fine conductive powder and a resistivity adjusting agent is preferably a fine conductive powder which implements charge exchange and causes a leakage of a charge at a proper level. As a result of co-existence of a resistivity adjusting agent, it becomes possible to avoid an increase in electric charge on particles, that is a so-called charge-up, caused by an intraparticulate friction and a friction between surfaces of a particle and a substrate, respectively, over a long term.

Examples of the resistivity adjusting agents include a fine inorganic powder, having a volume resistivity generally of $1 \times 10^6$ Ωcm or lower and preferably of $1 \times 10^4$ Ωcm or lower. Specific examples thereof include: fine particles of tin oxide, titanium oxide, zinc oxide, iron oxide; fine particles coated with respective various conductive oxides such as a titanium oxide particle coated with tin oxide; and the like. A resistivity adjusting agent is preferably achromatic, low in color developing power or being of a color of the same family as the colors of all of particles included. The meanings of the terms are similar to those described as to a charge control agent. An amount to be added, of a resistivity adjusting agent, is not particularly restricted as far as the amount falls within a range in which coloring of color particles is not disturbed, and is preferably in the range of 0.1 to 10% by mass.

Diameters of the particles for a display device of the invention are not defined in any specific manner. But, in order to obtain a good image, a volume average particle diameter thereof is preferably in a range of 1 to 100 μm and more preferably in a range of 3 to 30 μm. A particle size distribution is preferably sharp in the shape and more preferably of a single dispersion.

(Production Method for Particle for a Display Device)

A particle for a display device of the invention can be preferably produced by various methods including: wet production methods, with which spherical particles are produced, such as suspension polymerization, emulsion polymerization, dispersion polymerization and the like; pulverization and classification methods producing conventional irregular shaped particles; and the like. Besides, a heat treatment can be preferably applied in order to make shapes of particles uniform.

Furthermore, a method for making particle size distributions uniform can be adjusted according to classification. Examples of the means for classification include various types of vibration sieves, an ultrasonic sieve, an air sieve, a wet sieve, a rotor rotational classifier using a principle of a centrifugal force, a wind-forced classifier and the like. The means for classification is not restricted to these specific examples. The aforementioned tools and machines are used either alone or in combination of various types so that the particle size distribution is adjusted to a desired one. In the case where the particle size distribution is to be adjusted very precisely, it is preferable to use a wet sieve.

As methods for controlling the shapes of particles (a method for controlling a shape coefficient), a method described in JP-A No. 10-10775, as described below, can be preferably used. The method includes the steps of: adding an organic solvent which is compatible with a monomer (i.e., with no or little compatibility with a solvent) and is non-polmerizable, in a so-called suspension polymerization method in which a polymer is dissolved into a solvent, a colorant is mixed into the solution, the mixture is dispersed into an aqueous medium in the presence of an inorganic dispersant so that particles are produced; effecting suspension polymerization; then taking out the particles and drying the particles, wherein the manner in which the organic solvent is removed for drying can be appropriately selected.

As the drying method, a freeze-drying method can beappropriately used. The freeze-drying method is preferably performed at a temperature in the range of from −10° C. to −200° C. (more preferably in the range of from −30° C. to −180° C.). The freeze-drying method is generally performed at a pressure of 40 Pa or lower and preferably at a pressure of 13 Pa or lower. Herein, examples of the organic solvent include ester solvents such as methyl acetate, propyl acetate and the like; ether solvents such as diethyl ether and the like; ketone solvents such as methyl ethyl ketone, methyl isopropyl ketone, methyl isobutyl ketone and the like; hydrocarbon solvents such as toluene, cyclohexane, and the like; and halogenated hydrocarbon solvents such as dichloromethane, chloroform, trichloroethylene and the like. The solvents can preferably dissolve a polymer therein and a solubility in water is preferably in a range of 0 to 30% by mass. Cyclohexane is especially preferable among them in consideration of safety, cost and productivity in industrialization.

Examples of the method for controlling the shapes of particles further include: a method described in JP-A No. 2000-292971 in which small particles are aggregated and integrated to obtain particles with desired particle diameters; and a method in which particles obtained by means of conventional methods such as melt kneading, pulverization, classification or the like are further processed by a mechanical impact force (for example, a hybridizer manufactured by Nara Machinery Co., Ltd., Ang mill manufactured by Hosokawamicron Corporation, θ composer manufactured by_Tokuju Kosakujo K. K. and the like).

[Construction of Image Display Medium of the Invention]

An image display medium of the invention includes: a pair of substrates facing each other; and a particle group composed of at least 2 or more types of particles sealed in a clearance between the pair of substrates, at least one type of the two or more types of particles having a positively chargeable property while at least another type thereof having a negatively chargeable property, and the positively chargeable particles and the negatively chargeable particles being, in respective colors, different from each other, wherein at least one type of the positively/negatively chargeable particles is a particle for a display device of the invention.

(Particle Group Composed of Two or More Types of Particles)

In a particle group composed of two or more types of particles in the invention, at least one type thereof (a first particle) is positively chargeable while at least another type thereof (a second particle) is negatively chargeable, and the positively/negatively chargeable particles are, in respective colors, different from each other.

In an image display medium of the invention, the specific gravity of at least one of the first particle and the second particle is reduced, to thereby achieve an object described above. That is, an image display medium of the invention uses a particle for a display device of the invention containing nitrogen atoms in the range of from 0.03 mmol/g to 0.2 mmol/g as the at least one particle of the first particle and second particle, thereby enabling reduction in aggregation between particles and peeling of a particle from a substrate, to hold a stable display image. Therefore, an image display medium of the invention not only can set a drive voltage at a low value, but can also ensure a stable display image over a long term despite an external shock imposed thereon and being at a stand still for a long time.

In the above description, it has been described that the image display medium includes the first particle which is positively chargeable of (only) one type and the second particle which is negatively chargeable of (only) one type. However, the image display medium may include two or more types of the first particles and two or more types of the second particles. In a case of two or more types of the first particles and two or more types of the second particles are used, as far as one of two or more types is a particle for a display device of the invention, the effect of the present invention is exerted due to an action mechanism similar to that described above.

The first particle and the second particle, that is both particles positively/negatively chargeable in an image display medium of the invention are hereinafter collectively referred to as a "display particle." Such device particles, i.e., both the first and the second particles, are preferably constituted of the particle for a display device of the present invention. However, it is acceptable to use a conventional particle for a display device which is out of the scope of the present invention, together with the particle for a display device of the present invention.

As a conventional particle that can be used together with the particle for a display device of the invention, there can be used a particle composed of at least a colorant and a resin, which are similar to those of a particle for a display device of the invention. Furthermore, it is acceptable to optionally add other components such as a charge control agent and/or a polymer fine particles. It is acceptable that the colorant also serves as a charge controlling agent.

In an image display medium of the invention, one of the first and second particles of the particle for a display device is preferably white. In other words, the image display medium preferably includes a white colorant. With one of the first and the second particles of white being adopted, a coloring power and density contrast of the other particle can be improved. As a white colorant for making the one particle white, titanium oxide is preferable. With titanium oxide as a colorant being adopted, concealability can be made high and a density contrast can be further improved in the range of wavelengths of visual light. Rutile type titanium oxide is especially preferable as a white colorant.

As titanium oxide used in the invention, two or more types of particles having different particle diameters from each other are preferably used. Titanium oxide are generally poor in dispersibility, and even if the dsipersibility thereof is improved, particles having relatively large diameters exhibit quick occurrence of secondary and tertiary aggregation due to the higher specific gravity, whereby the dispersion stability and concealability are eventually deteriorate. On the other hand, particles having relatively small diameters cannot sufficiently scatter light and are likely to exhibit a low concealability. Therefore, by using two or more types of particles of titanium oxide having different average diameter from each other, both of dispersion stability and concealability can be simultaneously improved.

A diameter of at least one type of primary particles of titanium oxide usable in practice is preferably in the range of from 0.1 µm to 1.0 µm, which particle diameter exhibits optically high in concealability. Diameter(s) of the other type(s) of primary particles of titanium oxide is preferably less than 0.1 µm.

Furthermore, a particle of titanium oxide having a relatively small diameter may be surface treated. Examples of such a surface treating agent include: various types of coupling agents; and a solution obtained by dissolving an organic compound into a solvent such that the surface treatment does not affect whiteness.

The specific gravity of a white display particle including titanium oxide is particularly larger than that of a display particle having another color; therefore, it is especially preferable to use, as the display particle, a particle for a display device including a polymer particle. Furthermore, fine polymer particles, which are hollow, are present within such a particle for a display device. As a result, whiteness is enhanced and thus a higher contrast can be expected.

In the invention, there exists no such restriction as "one type of the display particles must be white". For example, as the color of the one type of the display particles, black or a color other than black and white may be used. In short, a combination of black and a color which is neither black nor white, or a combination of two colors which are neither white nor black may be acceptable. In this case, a character and a symbol of black (or chromatic color) can be effectively switched to a character or a symbol of a different color.

In display particles, it is necessary to adjust the particles so that one of the particles has a positively chargeable property and the other (or another) of the particles has a negatively chargeable property. When collision and friction occurs between particles of plural types and these particles are electrically charged, one type of the particles is positively charged while the other is negatively charged according to the order of electrification (plus to minus) of the display particles. Therefore, by selecting a charge control agent described above in an appropriate manner, the order of electrification (plus to minus) of the display particles can be adjusted appropriately.

As for particle sizes of display particles, in the case where display particles are composed of white particles and black particles, for example, by making particle diameters and distributions of white particles and black particles almost equal to each other, an "attaching" state where large diameter particles (so-called a two-component developer) are surrounded with smaller diameter particles to thereby lower the intrinsic color density of the large diameter particle, can be avoided. As a result, significantly high white density and high black density can be obtained. From this view point, a particle size distribution of display particles is preferably approximately 15% or less, when expressed as variation coefficient, and a single dispersion is especially preferable. Note that the term "variation coefficient" represents a quotient obtained by dividing a standard deviation of a volume average particle diameter in a particle size distribution of display particles by an arithmetic mean of volume average particle diameters, followed by multiplication by 100.

A contrast may vary according to a mixing ratio of white and block particles. Therefore, a mixing ratio is preferably the one at which surface areas of white and black display particles are almost equal to each other. If a mixing ratio is deviated from this value of equality in surface area, a color of particles with a higher proportion may be more strongly sensed. However, this cannot be applied in the case where a contrast is provided with a deep tone and a light tone in the same color nor in the case where a display is presented with a color produced by mixing two types of colored particles.

(Substrates)

A pair of substrates are used so as to face each other in an image display medium of the invention and display particles described above are sealed in a clearance between the pair of substrates. In the invention, the substrates are sheets with conductivity (conductive substrates) and in order that an image display medium works, at least one of the pair of substrates is necessary to be a transparent conductive sheet. On this occasion, the transparent conductive substrate serves as a display substrate.

As for a conductive substrate, a substrate itself may be conductive or a surface of an insulating support may be subjected to a conductivity imparting treatment, and furthermore, no limitation is placed on whether a substrate is of crystal or amorphous. As conductive substrates in the case where each substrate itself is conductive, examples thereof include: substrates made of metals such as aluminum, stainless steel, nickel and chrome and an alloy crystal; and substrates made of semiconductors such as Si, GaAs, GaP, GaN, SiC and ZnO.

As insulating supports, examples thereof include a polymer film, glass, quartz and ceramic. A conductivity imparting treatment on an insulating support can be implemented by forming a film, on the support, that is made of each of metals named as specific examples of a conductive substrate material in the case where the substrate itself is conductive, or gold, silver, copper and the like according to an evaporation method, a sputtering method, an ion plating method or the like.

As transparent conductive substrates, there are used a conductive substrate obtained by forming a transparent electrode on one surface of an insulating transparent support; and a transparent support that has conductivity in itself. As transparent supports in themselves having conductivity, examples thereof include supports made of transparent conductive materials such as ITO (Indium Tin Oxide), zinc oxide, tin oxide, lead oxide, indium oxide, copper iodide and others.

As insulating transparent supports, there are used films, sheets, optical fibers, SELFOC optical plates and the like made of: transparent inorganic materials such as glass, quartz, sapphire, MgO, LiF, $CaF_2$ and the like; and organic resins such as fluororesin, polyester, polycarbonate, polyethylene, polyehtylene terephthalate, epoxy resin and the like.

As transparent electrodes each provided on one surface of a transparent support described above, there are used transparent films made of transparent conductive materials such as ITO, zinc oxide, tin oxide, lead oxide, indium oxide, copper iodide and the like formed according to methods such as of evaporation, ion plating, sputtering and the like; and films of a metal such as Al, Ni, Au and the like, which has been made so thin as to be semi-transparent by evaporation and sputtering.

Since surfaces facing each other of substrates exert an influence on a charging property of display particles, a protective layer with a proper surface state is preferably provided on each of the surfaces facing each other. A protective layer can be selected primarily from the viewpoint of adhesiveness to a substrate, a transparency, the order of electrification (plus to minus) of the display particles; and a surface-contamination resistant property. As materials of protective layers, examples thereof include polycarbonate resin, vinylsilicone resin, a fluorine group containing-resin and the like. A resin, which exhibits relatively small difference in friction charge: between itself and the main component contained in the display particles in use; and between itself and the display particles, is selected.

Embodiments of Image Forming Apparatus of the Invention

Detailed description will be given of an image forming apparatus of the invention using an image display medium of the invention below with reference to accompanying drawings. Note that components having the same functions are attached by the same symbols in all of cited figures and the detailed description thereof will be omitted.

First Embodiment

FIG. 1 is a schematic structural view showing an example (a first embodiment) of an image forming apparatus of the invention.

An image forming apparatus 12 pertaining to the first embodiment, as shown in FIG. 1, has a voltage application means 201. An image display medium 10 includes spacers 204 provided between a display substrate 14 on which an image is displayed and a non-display substrate 16 facing the display substrate 14 so as to seal the outer peripheries of the display substrate 14 and the non-display substrate 16, and black particles 18 and white particles 20 as display particles are sealed in a clearance surrounded with the display substrate 14, the non-display substrate 16 and the spacer 204. Transparent electrodes 205 are provided on opposite surfaces (surfaces which face each other) of the display substrate 14 and the non-display substrate 16, respectively, wherein the transparent electrode 205 provided on an opposite surface of the non-display substrate 16 is grounded and the transparent electrode 205 provided on an opposite surface of the display substrate 14 is connected to the voltage application means 201.

Then, detailed description will be given of the image display medium 10.

A 7059 glass substrate, for example, of a size of 50×50× 1.1 mm having a surface on which an ITO transparent electrode as the transparent electrode 205 is provided can be used as each of the display substrate 14 and the non-display substrate 16 constituting the image display medium 10. Polycarbonate resin layers 206 (a layer made of polycarbonate resin (PC-Z) with a thickness of 5 μm) are provided on the surfaces of the transparent electrodes 205 formed on the opposite surfaces of the display substrate 14 and the non-display substrate 16, respectively.

As the spacer 204, there can be used a spacer obtained by cutting off a square part of a size of 15×15 mm from the central portion of a silicone rubber plate of a size of 40×40×0.3 mm.

In preparation of the image display medium 10, the silicone rubber plate with a square hole is placed on an opposite surface of the non-display substrate 16. Then, as display particles, for example, white spherical particles 20 of a volume average particle diameter of 20 μm, containing titanium oxide and black spherical particles 18 of a volume average particle diameter of 20 μm, containing carbon are mixed with each other in a mass ratio of 2 to 1, and about 15 mg of the mixed particles is sieved through a screen, to fall within a square hole cut off from the silicone rubber plate placed on the opposite surface of the non-display substrate 16. Thereafter, the opposite surface of the display substrate 14 is put into close contact with the silicon rubber plate and both substrates are pressure held with a double clip clamping the substrates to thereby put the silicone rubber plate and both substrates into close contact with each other, to produce an image display medium 10.

Note that particle for a display device of the invention is used as at least one of the black particles 18 and the white particles 20.

Second Embodiment

Detailed description will be given of the second embodiment of the invention below with reference to accompanying drawings.

Figure 2:
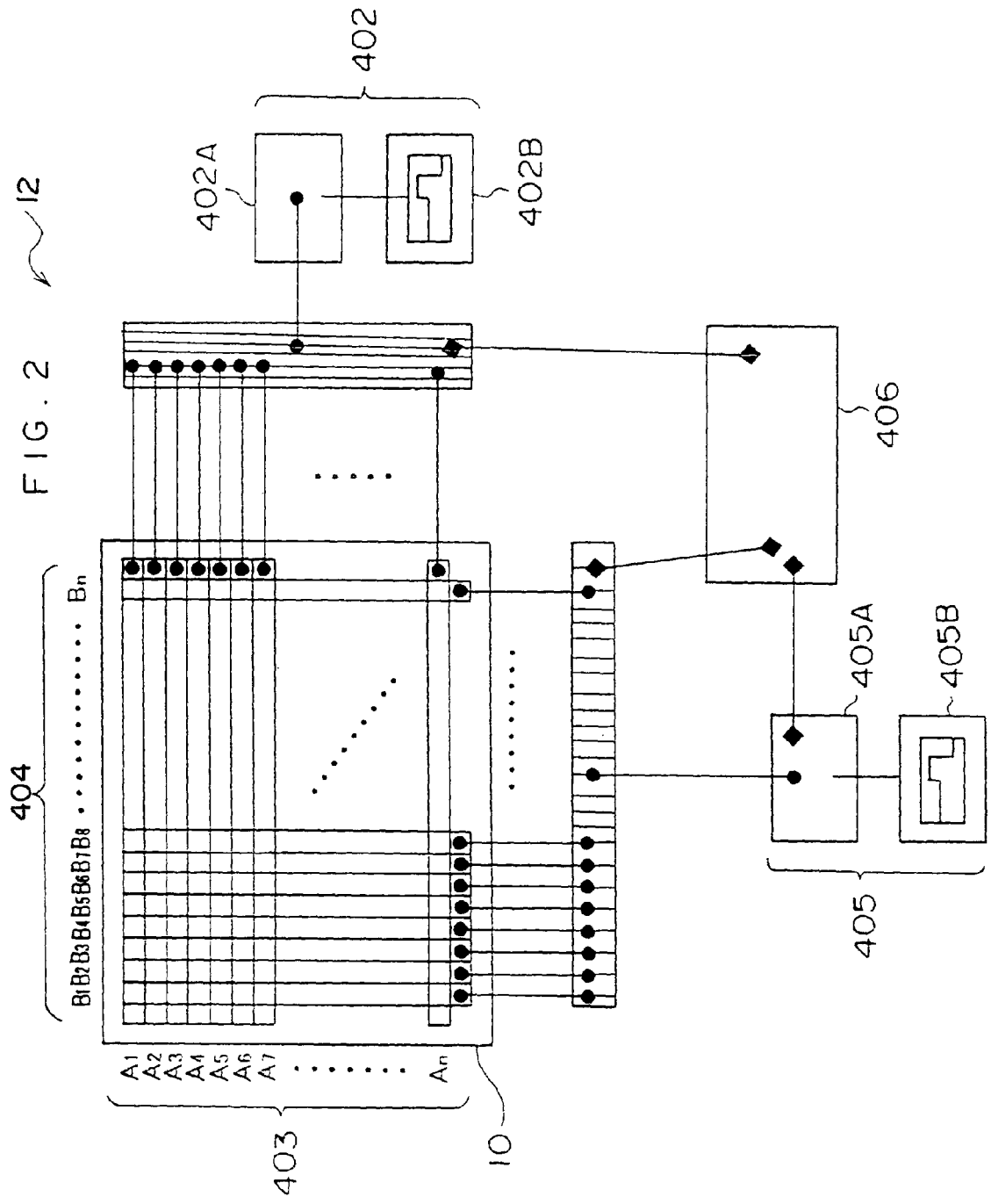
FIG. 2 is a diagram of a schematic configuration showing another example (a second embodiment) of the image forming apparatus of the invention.

FIG. 2 is a schematic structural diagram showing another example (a second embodiment) of the image forming apparatus of the invention and in FIG. 2, there is shown an image forming apparatus 12 for forming an image on the image display medium 10 using a simple matrix.

Electrodes 403An and 404Bn (wherein n is a positive number) for controlling voltages in a column direction and a row direction are arranged so as to form a simple matrix structure, in planes parallel to the image display medium 10 in which plural groups of display particles (not shown) different in chargeability from each other are sealingly enclosed. The electrodes 403An are connected to a power supply 405A of an electric field generating apparatus 405 constituted of a waveform generating apparatus 405B and the power supply 405A, and the electrodes 404Bn are connected to a power supply 402A of an electric field generating apparatus 402 constituted of a waveform generating apparatus 402B and the power supply 402A. Furthermore, the electrodes 404Bn, the power supply 405A, the electrodes 403An are connected to a sequencer 406.

In presenting a display of an image, potentials are applied on the electrodes 403An and 404Bn with the electric field generating apparatus 402 or 405 and potential drive timings of the electrodes are controlled by the sequencer 406 to control driving of voltages on the respective electrodes and to apply, to the electrodes 403A1 to 403An on one surface, an electric field by which display particles are driven in the unit of one row. On the other hand, an electric field adapted for image information can be provided simultaneously to the electrodes 404B1 to 404Bn on the other surface.

Figure 3:
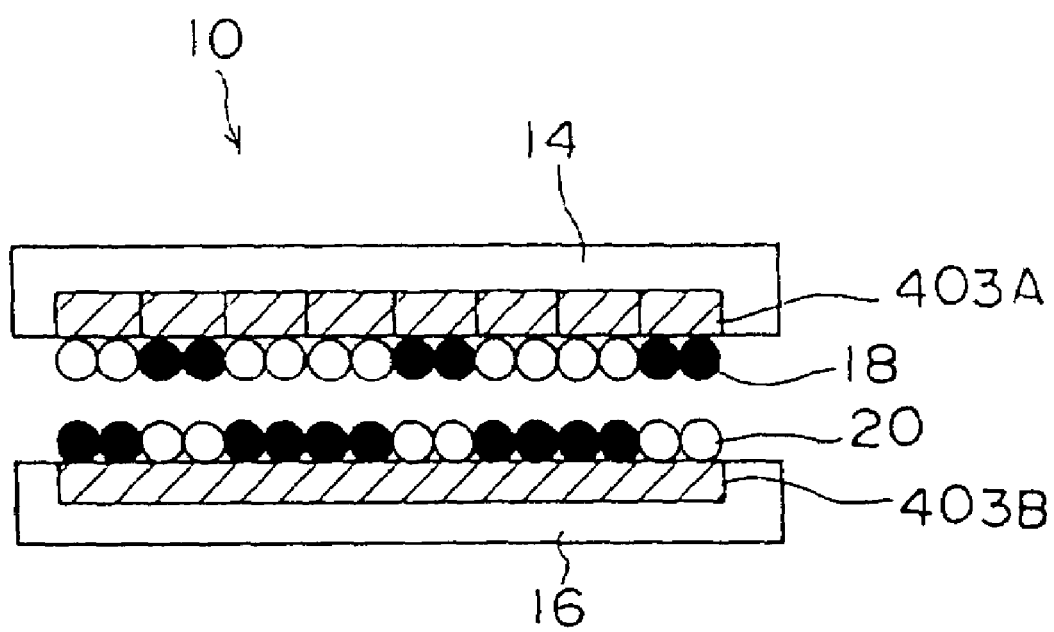
FIG. 3 is a schematic, sectional view of the image forming section (an image display medium) in an arbitrary plane of the image forming apparatus shown in FIG. 2.
Figure 4:
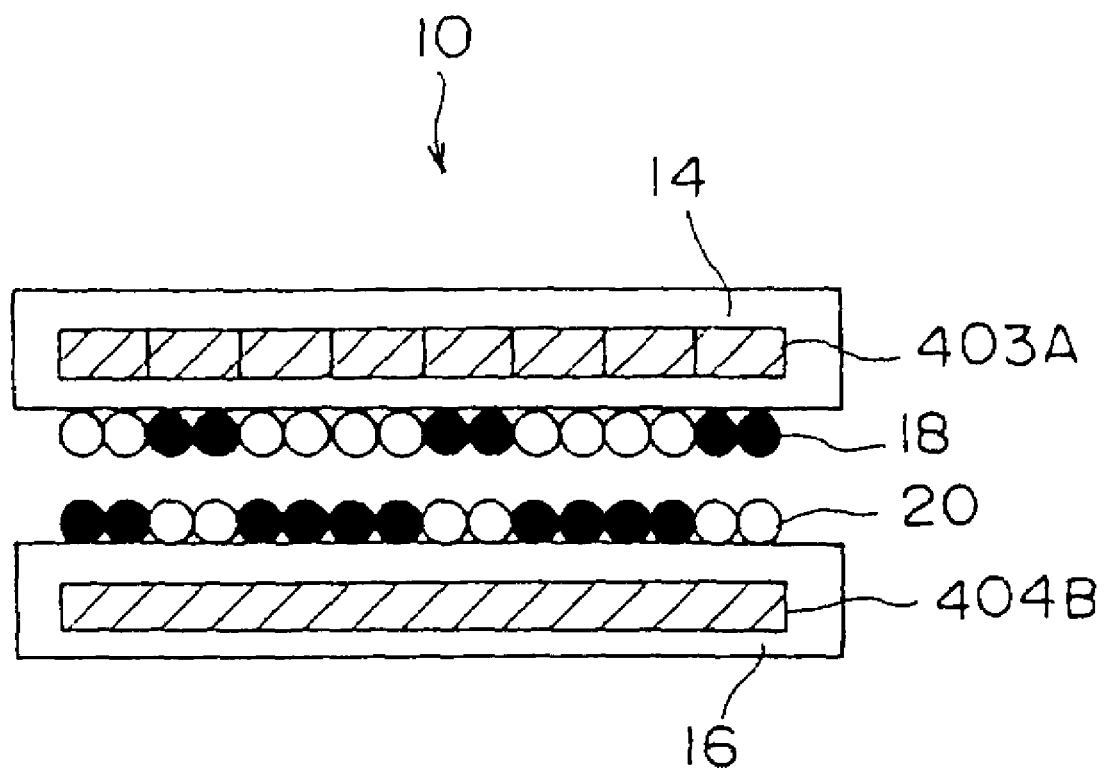
FIG. 4 is another schematic, sectional view of the image forming section (the image display medium) in an arbitrary plane of the image forming apparatus shown in FIG. 2.
Figure 5:
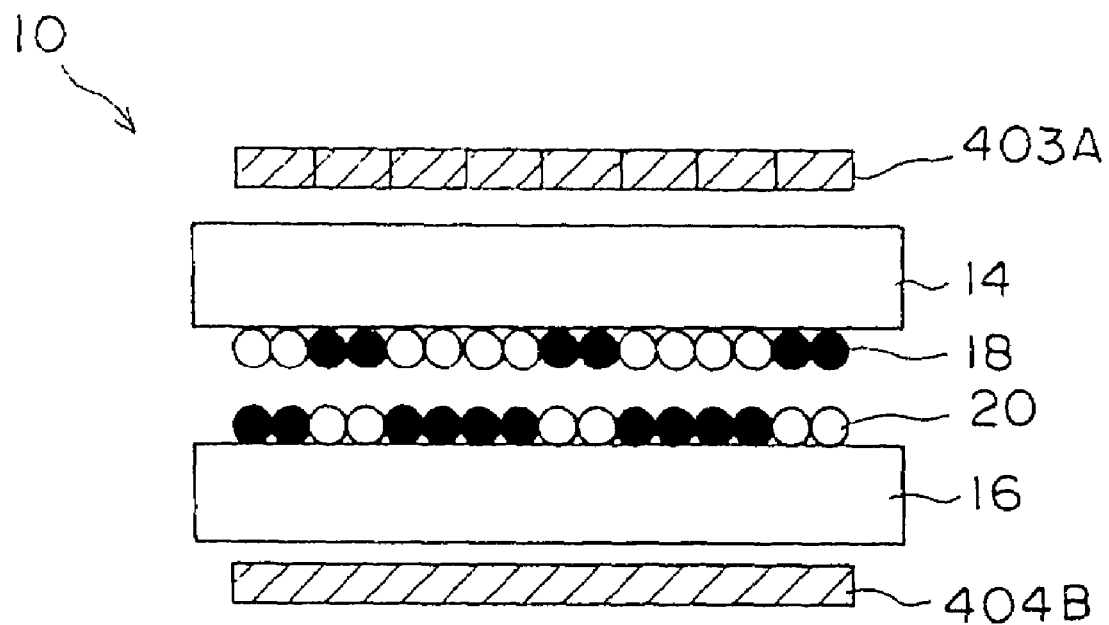
FIG. 5 is still another schematic, sectional view of the image forming section (the image display medium) in an arbitrary plane of the image forming apparatus shown in FIG. 2.

FIGS. 3 to 5 show examples of schematic sectional views of the image forming sections (the image display medium 10) in arbitrary planes of the image forming apparatus 12 shown in FIG. 2.

The display particles 18 and 20 are in contact with electrodes or substrate surfaces and at least one of the substrate 14 and the substrate 16 is transparent to thereby enable colors of display particles 18 and 20 to be seen through and sensed externally. The electrodes 403A and 404B may be, as shown in FIG. 3, embedded in respective opposite surface portions of the substrates 14 and 16 and integrated into single pieces; as shown in FIG. 4, embedded in the interior of the respective substrates 14 and 16 and integrated into single pieces; and as shown in FIG. 5, arranged a little spaced apart outwardly from the other surfaces of the opposite surfaces of the display substrate 14 and the non-display substrate 16, respectively.

A proper electric field is set in the image forming apparatus 12, whereby a simple matrix driven display becomes possible. Note that the display particles 18 and 20 can be driven, as long as each has a threshold value of movement with respect to the electric field. The display particles 18 and 20 are not under any other limitations. That is, colors, charge amounts thereof, properties of charged electrodes and the like, of the display particles 18 and 20 are basically not restricted.

Third Embodiment

Detailed description will be given of the third embodiment of the invention below with reference to accompanying drawings. FIG. 6 is a view of a schematic construction showing still another example (a third embodiment) of the image forming apparatus of the invention and in the figure. Specifically, there is shown an image forming apparatus using a printing electrode.

An image forming apparatus 12 shown in FIG. 6 includes: a printing electrode 11; and an opposite electrode 26, arranged oppositely to the printing electrode 11, and connected to earth.

An image display medium 10 can be transported in a direction of an arrow mark B between the printing electrode 11 and the opposite electrode 26. The image display medium 10 is constituted of a pair of substrates (a display substrate 14 and a non-display substrate 16); and display particles 18 and 20 sealed between the substrates. When the image display medium 10 is transported in the direction of an arrow mark B, the non-display substrate 16 is located close to or in contact with the opposite electrode 26 and the display substrate 14 is transported while being located close to the printing electrode 11.

Note that the printing electrode 11 is constituted of a substrate 13; and electrodes 15 on the display electrode side 14 of the substrate 13, and the printing electrode 11 is connected to a power supply not shown.

Description will be given of arrangement and shapes of the electrodes 15 provided on the display substrate side 14 of the printing electrode 11. FIGS. 7A to 7C are schematic diagrams showing examples of arrangement patterns of electrodes provided at the printing electrode. Specifically, FIG. 7A to 7C each show an arrangement pattern of the electrodes 15 of the printing electrode 11, viewed from the non-display substrate 16 to the display substrate 14 in FIG. 6.

The electrodes 15 are, as shown in FIG. 7A, arranged facing one surface of the display substrate 14 in one row at a prescribed spacing so as to be adapted for a resolution of an image along a direction (that is a main scan direction) almost orthogonal to a transport direction (the direction of an arrow mark B) of the image display medium 10. The electrodes 15 each may be square as shown in FIG. 7B and may be arranged in a matrix as shown in FIG. 7C.

Figure 8:
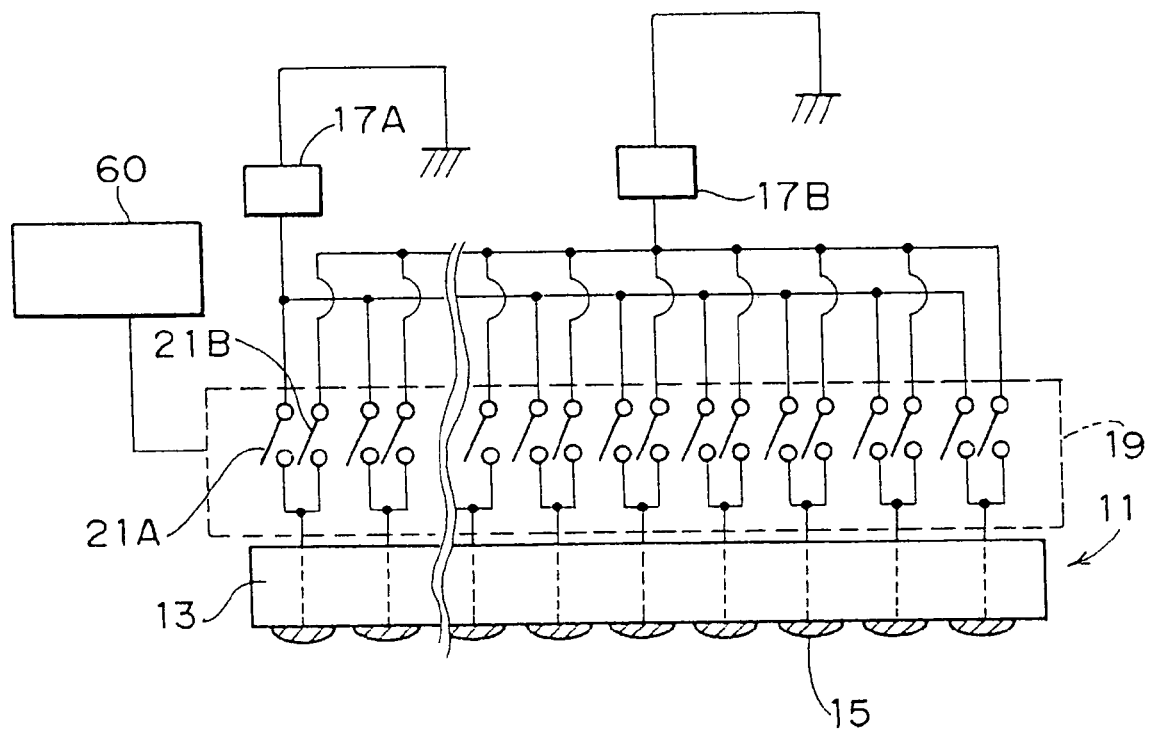
FIG. 8 is a diagram of a schematic structure of the printing electrode.

Detailed description will be given of the printing electrode below. FIG. 8 is a diagram of a schematic configuration of the printing electrode.

An AC power supply 17A and a DC power supply 17B are, as shown in FIG. 8, connected to the electrodes 15 through a connection control section 19. The connection control section 19 is constituted of plural switches including switches 21A, connected to the respective electrodes 15 at one ends thereof and connected to the AC power supply 17A at the other ends thereof; and switches 21B, connected to the respective electrodes 15 at one ends thereof and connected to the DC power supply 17B at the other ends thereof.

The switches 21A and 21B are on/off controlled by a control section 60 and electrically connect the AC power supply 17A and the DC power supply 17B to the electrodes 15. With such a configuration adopted, there can be applied an AC voltage, a DC voltage or a voltage obtained by superposition of an AC voltage and a DC voltage one on the other.

Description will be given of workings in the third embodiment.

The image display medium 10 is at first transported in the direction of an arrow mark B in the figure, with transport means not shown, between the printing electrode 11 and an opposite electrode 26, and a control section 60 turns on all the switches 21A by instructing the control connection section 19 to do so. Thereby, an AC voltage is applied to all the electrodes 15 from the AC power supply 17A.

The image display medium 10 here is a medium in which two or more groups of display particles is sealed in a space between a pair of substrates without electrodes embedded therein.

If an AC voltage is applied to the electrodes 15, the black particles 18 and the white particles 20 in the image display medium 10 move reciprocally between the display substrate 14 and the non-display substrate 16. With such reciprocal movement, the black particles 18 and the white particles 20 are friction charged by friction between display particles and friction between the display particles and the substrates. For example, the black particles 18 are positively charged, while the white particles 20 are uncharged or negatively charged. Note that description below will be given on condition that the white particles 20 are negatively charged.

The control section 60 then instructs the connection control section 19 to turn on only a switch 17B corresponding to an electrode 15 which then represents image data, to apply a DC voltage to the electrode 15 at a position corresponding to (i.e., representing) the image data. For example, a DC voltage is applied to the non-image portion but not to the image portion.

With such an application, in the case where a DC voltage is applied to an electrode 15, the positively charged black particles 18 in a portion on the display substrate 14 facing the printing electrode 11, as shown in FIG. 6, are moved to the non-display substrate 16 side by the action of an electric field. On the other hand, the negatively charged white particles 20 in the corresponding portion on the non-display substrate 16 are moved to the display substrate 14 side with the action of an electric field. Therefore, since only the white particles 20 are gathered on the display substrate 14, no image is displayed in a portion on a screen corresponding to the non-image portion.

On the other hand, in the case where no DC voltage is applied to an electrode 15, black particles 18 in a portion on the display substrate 14 facing the printing electrode 11 are maintained where they are on the display substrate 14 by the action of an electric field. Furthermore, positively charged black particles 18 on the non-display substrate 16 moves to the display substrate 14 side by the action of an electric field. Therefore, only black particles 18 are gathered on the display substrate 14 at a portion where a DC voltage is not applied, whereby an image is displayed in the portion (i.e., the image portion).

In such a way, the black particles 18 and the white particles 20 are moved according to an image, thereby displaying an image on the display substrate 14. Note that in the case where the white particles 20 are not charged, only the black particles 18 move under an influence of an electric field. Black particles 18 in a portion where no image is displayed move to the non-display substrate 16 and, when viewed from the display substrate 14, the screen thereof is concealed by white particles 20, thereby enabling display of an image. Furthermore, even after an electric field which has been generated between substrates of the image display medium 10 disappears, the displayed image remains on the screen since an adhering force characteristic of display particles works. Besides, since the display particles can again move under an electric field newly generated between substrates, an image can be repeatedly displayed by the image forming apparatus 12.

In such a way, since charged display particles move by an electric field with air as a medium, a high safety is ensured. Moreover, since air is low in viscous resistance, a high speed responsiveness can be met.

Fourth Embodiment

Figure 9:
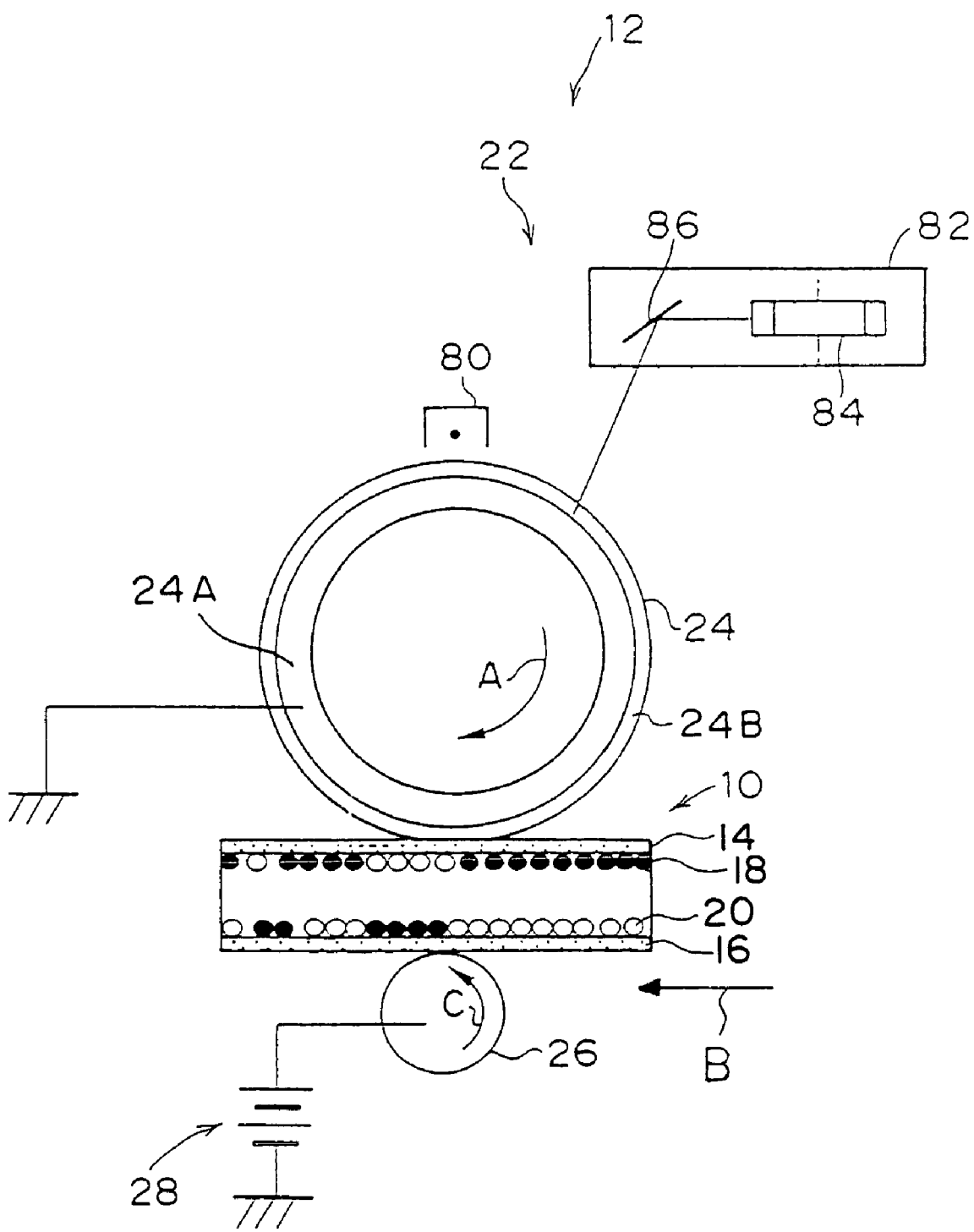
FIG. 9 is a view showing a schematic structure of yet another example (a fourth embodiment) of the image forming apparatus of the invention.

Detailed description will be given of the fourth embodiment of the invention below with reference to accompanying drawings. FIG. 9 is a view of a schematic construction showing yet another example (a fourth embodiment) of the image forming apparatus of the invention and in FIG. 9. An image forming apparatus using a electrostatic latent image carrier is shown.

An image forming apparatus 12 shown in FIG. 9 is constituted mainly of: a electrostatic latent image carrier 24 in the shape of a drum rotatable in a direction of an arrow mark A; and an opposite electrode 26 in the shape of a drum, disposed oppositely to the electrostatic latent image carrier 24, and rotatable in a direction of an arrow mark C, and an image display medium 10 in which display particles are sealed between a pair of substrates can pass through between the electrostatic latent image carrier 24 and the opposite electrode 26 in the direction of an arrow mark B.

A charging device 80 is disposed at the periphery of the electrostatic latent image carrier 24 such that the charging device 80 is located on the substantially opposite side, with respect to the carrier 24, of the opposite electrode 26 and close to the electrostatic latent image carrier 24. A light beam scanning apparatus 82 is disposed near the charging device 80 so as to enable an electrostatic latent image to be formed on the surface of the electrostatic latent image carrier 24 in the direction of the arrow A. In short, these three members, i.e., the electrostatic latent image carrier 24, the charging device 80, and the light beam scanning apparatus 82 constitute an electrostatic latent image forming section 22.

As the electrostatic carrier 24, there can be used a photosensitive drum 24. The photosensitive drum 24 is of a structure that a photoconductive layer 24B is formed on the outer periphery surface of a conductive substrate 24A made of a metal such as aluminum or SUS in the shape of a drum, wherein as the photoconductive layer 24B, there can be used various types of well known materials. Examples of the material include inorganic photoconductive materials such as $\alpha$-Si, $\alpha$-Se, $As_2Se_3$ and the like; and organic photoconductive materials such as PVK/TNF, with which a photocinductive layer 24B can be formed by plasma CVD, vapor-depositing, dipping and the like. In addition, a charge transporting layer, an overcoat layer and the like may be formed if necessary. The conductive substrate 24A is grounded.

The charging device 80 is a device to uniformly charge the surface of the electrostatic latent image carrier 24 to a desired potential. It suffices that the charging device 80 capable of charging the surface of the photosensitive drum 24 to a desired potential and, in this embodiment, a corotron is used of a structure that a high voltage is applied on an electrode wire to generate a corona discharge between the electrostatic latent image carrier 24 and the electrode wire and to thereby uniformly charge the surface of the photosensitive drum 24. In addition thereto, there can be used various types of well known chargers, such as a charger that puts a conductive roll member, a brush member, a film member or the like into contact with the photosensitive drum 24, to which a voltage is applied, and to thereby charge the surface of the photosensitive drum.

A light beam scanning apparatus 82 irradiates the light beam of a small spot on a charged surface of the electrostatic latent image carrier 24, based on an image signal, thereby generating a latent image on the electrostatic latent image carrier 24. It suffices that the light beam scanning apparatus 82 irradiates a light beam on a surface of the photosensitive drum 24 according to image information, to form an electrostatic latent image on the uniformly charged photosensitive drum 24. In the present embodiment, the light beam scanning apparatus is especially represented by ROS (a Raster Output Scanner) in which laser beam adjusted to a desired spot diameter is on/off controlled according to an image signal, by an imaging optical system including a polygon mirror 84 provided in the light beam scanning apparatus 82, a reflecting mirror 86, a light source and a lens (not shown) and the like, whereby the surface of the photosensitive drum 24 is photo-scanned by the polygon mirror 84. In addition thereto, there may be used an LED head or the like on which LEDs are arranged according to a desired resolution.

The opposite electrode 26 is constituted of, for example, an elastic conductive roll member. With such a construction adopted, the opposite electrode 26 can be made closer to the image display medium 10. Furthermore, the opposite electrode 26 is located such that the opposite electrode 26 faces the electrostatic latent image carrier 24, with the image display medium 10 which is transported by transport means (not shown) in a direction of an arrow mark B sandwiched therebetween. The opposite electrode 26 is connected to a DC voltage power supply 28. The opposite electrode 26 is applied with a bias voltage VB by the DC voltage power supply 28. For example, if a potential in a portion positively charged on the electrostatic latent image carrier 24 is VH and a potential in a portion not charged thereon is VL by definition, the applied bias voltage VB is, as shown in FIG. 10, an intermediate voltage between both voltages VH and VL.

Description will be given of workings in the fourth embodiment below.

When the electrostatic latent image carrier 24 starts rotating in the direction of an arrow mark A in FIG. 9, an electrostatic latent image is formed on the electrostatic latent image carrier 24 by the electrostatic latent image forming section 22. On the other hand, the image display medium 10 is transported in the direction of an arrow mark B by the transport means (not shown) to be inserted into between the electrostatic latent image carrier 24 and the opposite electrode 26.

Figure 10:
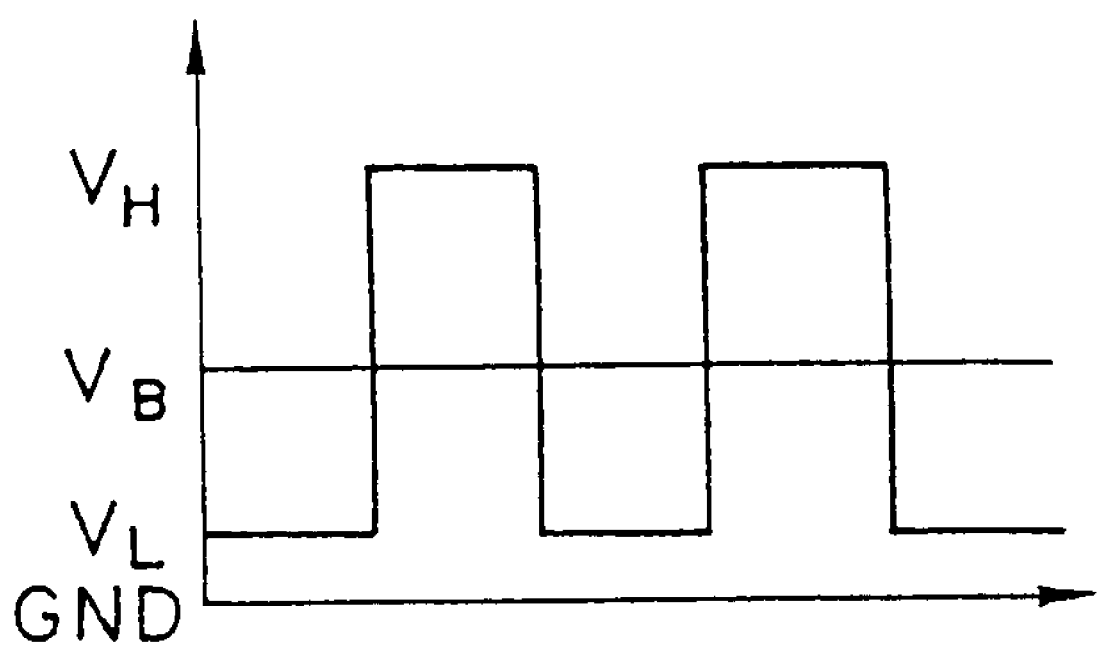
FIG. 10 is a graph showing potentials at an electrostatic latent image carrier relative to opposite electrodes.

In this situation, the opposite electrode 26 is, as shown in FIG. 10, applied with the bias voltage VB and a potential on the electrostatic latent image carrier 24 at a position facing the opposite electrode 26 is VH. Hence, in the case where a portion facing the display substrate 14, of the electrostatic latent image carrier 24, is positively charged (a non-image portion) and black particle 18 is attached to a portion facing the electrostatic latent image carrier 24, of the display substrate 14, positively charged particles 18 are moved from the display substrate 14 side to the non-display substrate 16 side and eventually attached to the non-display substrate 16. Thereby, since only white particles 20 are gathered on the display substrate 14, no image is displayed in a portion corresponding to a non-image portion.

On the other hand, in the case where a portion facing the display substrate 14, of the electrostatic latent image carrier 24, is not positively charged (an image portion) and black particles 18 are attached to a portion facing the opposite electrode 26, of the non-display substrate 16, a potential on the electrostatic latent image carrier 24 at the position (or portion) facing the opposite electrode 26 is VL; therefore, the charged black particles 18 move from the non-display substrate 16 side to the display substrate 14 side and eventually attached to the display substrate 14. Thereby, since only the black particles 18 are gathered on the display substrate 14 on the portion, an image is displayed in a portion corresponding to an image portion.

In such a way, the black particles 18 move according an image, to display the image on the display substrate 14. Note that even after an electric field generated between substrates of the image display medium 10 has disappeared, an image displayed by an attaching force intrinsic of particles and a mirror imaging capability between particles and a substrate is sustained. Moreover, since the black particles 18 and the white particles 20 can again move between the substrates under an influence of an electric field newly generated, an image can be repeatedly displayed by the image forming apparatus 12.

In such a way, since a bias voltage is applied to the opposite electrode 26, the black particles 18 can reliably be moved, either the black particles 18 are attached on the display substrate 14 or the non-display substrate 16. Hence, no necessity arises for attaching the black particles 18 to one substrate in advance. Furthermore, there can be obtained an image of high contrast and sharpness. In addition, since charged particles are moved in air serving as a medium under an influence of an electric field, a high safety is ensured. Besides, since air is low in viscosity resistance, a high speed responsiveness can also be achieved.

While description is given of the embodiments of an image forming apparatus of the invention using an image display medium of the invention with reference to the accompanying drawings, an image forming apparatus of the invention is not limited to the embodiments, but can be implemented in a desired construction. Furthermore, although a combination of colors of display particles are black and white in the above description, no particular limitation is placed on the combination, but a display particle having a desired color can be properly selected if necessary.

EXAMPLES

Detailed description will be further given of the present invention showing examples below. It should be understood, however, that the examples are not intended to limit the invention in any way. Note that in the following examples and comparative examples, there were used the image display medium and the image forming apparatus of the first embodiment (i.e., the image display medium and the image forming apparatus shown in FIG. 1) described in the section of [Embodiments of Image Forming Apparatus of the Invention]. In the following examples and comparative examples, dimensions and materials of the members are similar to those described in the section of [Embodiments of Image Forming Apparatus of the Invention].

(Preparation of White Particle)

Preparation of Dispersion A

Components in the following composition were mixed and pulverized in a ball mill using zirconia balls each of 10 mm in diameter during 20 hr to obtain a dispersion A.

<Composition>
cyclohexyl methacrylate: 64 parts by mass
titanium oxide (white pigment): 30 parts by mass (a primary particle diameter of 0.3 μm, manufactured by Ishihara Sangyo Kaisha, Ltd. with a trade name of Taipec CR63)
polymer fine particles (hollow particles): 5 parts by mass (a primary particle diameter of 0.3 μm, manufactured by JSR with a trade name of SX866(A))
charge control agent: 1 part by mass (manufactured by Orient Chemical Industries, Ltd. with a trade name of SBT-5-0016)

Preparation of Dispersion B

Components in the following composition were mixed and finely pulverized in a ball mill in a similar manner to the case of the dispersion A, to obtain a dispersion B.

<Composition>
calcium carbonate: 40 parts by mass
water: 60 parts by mass

Preparation of Dispersion C

Components in the following composition are mixed and degassed with an ultrasonic machine during 10 min, followed by agitating with an emulsifier to obtain a mixed solution C.

<Composition>
dispersion B: 7.0 g
20% sodium chloride aqueous solution: 50 g

The dispersion A, a weight of which was 35 g, and 1 g of divinylbenzene and 0.35 g of a polymerization initiator V601 were weighted and sufficiently mixed, and then degassed with a ultrasonic machine for 10 min. The mixed solution was added into the mixed solution C, followed by emulsification with an emulsifier. Then, the emulsion was put into a bottle, the bottle was stoppered with a silicone plug, a syringe needle was used for degassing under vacuum, followed by filling with nitrogen gas and then sealing. Then, a reaction was allowed to proceed at 70° C. during 10 hr to obtain particles. The obtained fine particles were dispersed in ion-exchanged water to decompose calcium carbonate with a hydrochloric acid aqueous solution, followed by filtration. Thereafter, a solid substance was washed with a sufficient amount of distilled water. The particle size was made uniform using a nylon sieves having respective pore sizes of 10 μm and 15 μm. The solid matter after sieving was dried to obtain white particles-1 with an average particle diameter of 12.56 μm (particle for a display device).

(Preparation of Black Particle 1)

Black particles-1 (particle for a display device of the invention) containing nitrogen atoms at 0.048 mmol/g were prepared in a similar manner to the case of preparation of the white particles-1 described above, except that a dispersion D described below obtained by dissolving diethylaminoethyl methacrylate as a nitrogen-containing compound was used instead of the dispersion A. An average particle diameter of the obtained black particles-1 is 13.5 μm.

Preparation of Dispersion D

Components in the following composition were mixed and pulverized in a ball mill using zirconia balls each of 10 mmφ in diameter for 20 hours to obtain a dispersion D.

<Composition>
methyl methacrylate: 53.46 parts by mass
diethylaminoethyl methacrylate: 0.54 parts by mass
microrysblack: 6 parts by mass (Preparation of Black Particle 2)

Black particles-2 (particle for a display device of the invention) containing nitrogen atoms at 0.1 mmol/g were prepared in a similar manner to the case of preparation of the white particle-1 described above, except that, instead of the dispersion A, there was used a dispersion E described below obtained by dissolving diethylaminoethyl methacrylate as a nitrogen-containing compound. An average particle diameter of the obtained black particles-2 was 13.34 μm.

Preparation of Dispersion E

Components in the following composition were mixed and pulverized in a ball mill using zirconia balls each of 10 mmφ in diameter for 20 hours to obtain a dispersion E.

<Composition>
methyl methacrylate: 52.92 parts by mass
diethylaminoethyl methacrylate: 1.08 parts by mass
microrysblack: 6 parts by mass (manufactured by Ciba Specialty Chemicals Inc.)
charge control agent: 1 part by mass (manufactured by Clariant (Japan) K.K. with a trade name of COPY CHARGE PSY VP2038)

(Preparation of Black Particle 3)

Black particles-3 (particle for a display device of the invention) were prepared in a similar manner to the case of preparation of the white particles-1 described above, except that there was used a dispersion F described below. An average particle diameter of the obtained black particles-3 was 13.24 μm.

Preparation of Dispersion F

Components in the following composition were mixed and pulverized in a ball mill using zirconia balls each of 10 mmφ in diameter for 20 hours to obtain a dispersion F.

<Composition>
methyl methacrylate: 90 parts by mass
microrysblack: 10 parts by mass (manufactured by Ciba Specialty Chemicals Inc.)

(Preparation of Black Particle 4)

Black particles-4 (particle for a display device of the invention) containing nitrogen atoms at 0.25 mmol/g are prepared in a similar manner to the case of preparation of the white particles-1 described above, except that there was used a dispersion G described below obtained by dissolving diethylaminoethyl methacrylate as a nitrogen-containing compound. An average particle diameter of the obtained black particles-4 was 13.27 μm.

Preparation of Dispersion G

Components in the following composition are mixed and pulverized in a ball mill using zirconia balls each of 10 mmϕ in diameter during 20 hr to obtain a dispersion G.

<Composition>
methyl methacrylate: 51.3 parts by mass
diethylaminoethyl methacrylate: 2.7 parts by mass
microrysblack: 6 parts by mass (manufactured by Ciba Specialty Chemicals Inc.)

Examples 1 and 2 and Comparative Examples 1 and 2

Sets (display particles 1 to 4) were prepared by mixing two types of particle for a display device including the white particle and one of the black particles-1 to 4 obtained as described above, as shown in Table 1.

The display particles 1 to 4 were sealed in a clearance between the substrates (the display substrate 14 and the non-display substrate 16) facing each other in the image display medium used in the image forming apparatus of the first embodiment shown FIG. 1, to obtain image display media of Examples 1 and 2 and Comparative Examples 1 and 2. At this time, a mixing ratio in terms of the number of particles between the white particles and a black particles was 2:1.

(Evaluation)

Evaluation was performed on the following aspects, using the obtained image display media and the image forming apparatus.

Drive Voltage

A DC voltage 100 V was applied to the transparent electrode 205 of the display substrate 14 in the image display medium 10 described above in which there had been sealed a prescribed amount of two types of particles obtained by mixing the white particles 20 and black particles 18 at a mass ratio of 2:1. When the DC voltage 100 V was applied, a portion of the white particles 20, which were negatively charged and resided in the non-display substrate 16 side, started to move to the display substrate 14 side by the action of an electric field; and when a DC voltage (drive voltage) was applied, much of the white particles 20 were moved to the display substrate 14 side to cause a display density to be almost saturated.

In parallel to movement of the white particles, the black particles 18 positively charged moved to the non-display substrate 16 side. Thereafter, although the voltage was set to 0 V, the display particles on the display substrate 14 did not move and thus caused no change in display density. The drive voltage, which was a DC voltage to be applied, is shown in Table 1.

An evaluation for an image was performed in a procedure including the steps: measuring black reflection density at five sites in each image (each site being a patch of 20 mm×20 mm) before and after ±switching of voltage, with a density measuring instrument X-Rite 404; and obtaining an average of the black reflection densities of the five sites for each image. If an average reflection density was 1.2 or higher, the image was judged to be good. Unevenness in image was visually judged.

As for evaluations on black reflection density and unevenness in image, the evaluations were performed first in an initial display state and then in a state after repeating 5 sets of ±switching of voltage (each set being performed for one minute at a frequency of 300 Hz). The result of the evaluation are shown in Table 1.

TABLE 1

| | Combinations of white particle and black particle | White particle | Black particle | Content of nitrogen atoms (mmol/g) | Drive voltage (V) | Initial display state | | After repetition of display | |
|---|---|---|---|---|---|---|---|---|---|
| | | | | | | Black reflection density | Unevenness in image | Black reflection density | Unevenness in image |
| Example 1 | Display particle 1 | White particle-1 | Black particle-1 | 0.048 | 200 | 1.45 | Good | 1.4 | Good |
| Example 2 | Display particle 2 | White particle-1 | Black particle-2 | 0.10 | 200 | 1.40 | Good | 1.2 | Good |
| Comparative example 1 | Display particle 3 | White particle-1 | Black particle-3 | 0.0 | 200 | Not driven at 200 V | With mottled pattern | — | — |
| Comparative example 2 | Display particle 4 | White particle-1 | Black particle-4 | 0.25 | 200 | 1.20 | With mottled pattern | 0.9 | With mottled pattern |

It is found from the results shown in Table 1 that by adjusting a content of nitrogen atoms contained in black particles in the range of from 0.03 mmol/g to 0.2 mmol/g, as in the particle for a display device of the invention, good images are obtained with a sufficiently high black reflection density without generating unevenness in image, and in addition, without causing a conspicuous reduction in black reflection density and thus without generating unevenness in image after repetition of display over a long term.

The invention, as described above, can provide a particle for a display device, with which neither an image density nor a density contrast is reduced after repeated rewriting, and decrease in uniformity of an image and resulting unevenness in image can be reliably prevented; an image display medium and an image forming apparatus using the aforementioned particle for a display device.

Furthermore, the invention can provide an image display medium capable of not only setting a drive voltage to a low value, but also ensuring a stable display image over a long term despite an external shock imposed thereon and being left still for a long time, and an image forming apparatus using the image display medium.

What is claimed is:

1. A particle for a display device having a positively or negatively chargeable property and a color, the particle comprising nitrogen atoms in an amount of 0.03 mmol/g to 0.2 mmol/g.

2. The particle for a display device according to claim 1, comprising nitrogen atoms in an amount of 0.05 mmol/g to 0.1 mmol/g.

3. The particle for a display device according to claim 1, wherein the nitrogen atoms take a bond formation enabling reduction in aggregation between particles and reduction in peeling of a particle from a substrate.

4. The particle for a display device according to claim 3, wherein the nitrogen atoms take any of the bond formations of primary to tertiary amines.

5. The particle for a display device according to claim 1, wherein the nitrogen atoms take a bond formation serving as a starting point in positive charging.

6. The particle for a display device according to claim 1, made from at least a colorant, a resin, and a nitrogen atom-containing compound.

7. An image display medium, comprising:
a pair of substrates facing each other; and
a particle group composed of at least two or more types of particles sealed in a clearance between the pair of substrates, at least one type of the two or more types of particles having a positively chargeable property, at least another type of the two or more types of particles having a negatively chargeable property, and the positively and negatively chargeable particles, respectively, being of colors that are different from each other, wherein at least one type of the positively and negatively chargeable particles contains nitrogen atoms in an amount of 0.03 mmol/g to 0.2 mmol/g.

8. The image display medium according to claim 7, wherein at least one type of the positively and negatively chargeable particles is black or of a chromatic color.

9. The image display medium according to claim 7, wherein at least one type of the positively and negatively chargeable particles is white.

10. The image display medium according to claim 9, wherein the white particles each include titanium oxide as a colorant.

11. The image display medium according to claim 10, wherein the white particles including titanium oxide comprise two or more types of particles having respectively different particle diameters from each other.

12. The image display medium according to claim 11, wherein a diameter of at least one type of the white particles including titanium oxide is in the range of from 0.1 µm to 1.0 µm, and a diameter of the other type of the white particles is less than 0.1 µm.

13. The image display medium according to claim 7, wherein the positively or negatively chargeable particles, respectively having colors that are different from each other, have respective particle diameters and distributions thereof that are substantially equal to each other.

14. The image forming apparatus for forming an image on the image display medium according to claim 7, comprising an electric field generating means generating an electric field corresponding to image information, between the pair of substrates.

15. The image display medium according to claim 14, wherein the electric field generating means is provided on a surface of each substrate, which surface faces the other substrate facing the other substrate.

16. The image display medium according to claim 14, wherein the electric field generating means is embedded in the interior of each substrate.

17. The image display medium according to claim 14, wherein the electric field generating means is arranged near a surface of each substrate, which surface is opposite from a surface which faces the other substrate.

18. An image forming apparatus, comprising:
an image forming medium on which an image is formed; and
an electric field generating means;
wherein the image forming medium includes:
a pair of substrates facing each other; and
a particle group composed of at least two or more types of particles sealed in a clearance between the pair of substrates, at least one type of the two or more types of particles having a positively chargeable property, at least another type of the two or more types of particles having a negatively chargeable property, the positively and negatively chargeable particles respectively being of colors that are different from each other, at least one type of the positively and negatively chargeable particles containing nitrogen atoms in a predetermined content, and the nitrogen atoms taking a bond formation enabling reduction in aggregation between the nitrogen-containing particles and reduction in peeling of the nitrogen-containing particle from a substrate, and wherein the electric field generating means generates an electric field corresponding to image information, between the pair of substrates, to thereby form an image on the image forming medium.

* * * * *